(12) United States Patent
Ilgenfritz

(10) Patent No.: US 7,810,686 B2
(45) Date of Patent: Oct. 12, 2010

(54) WATERCRAFT CARRIER

(76) Inventor: Milton Edward Ilgenfritz, 7117 Carriage Hill Dr., Laurel, MD (US) 20707-5365

( * ) Notice: Subject to any disclaimer, the term of this patent is extended or adjusted under 35 U.S.C. 154(b) by 996 days.

(21) Appl. No.: 11/359,160

(22) Filed: Feb. 22, 2006

(65) Prior Publication Data
US 2006/0186153 A1 Aug. 24, 2006

Related U.S. Application Data

(60) Provisional application No. 60/655,338, filed on Feb. 22, 2005.

(51) Int. Cl.
*B60R 9/04* (2006.01)
(52) U.S. Cl. ........................ 224/324; 224/310; 224/319; 224/568
(58) Field of Classification Search ................. 224/324, 224/310, 318, 309, 319, 320, 328, 563, 567, 224/568, 572; 114/381; 211/85.7; 248/503; 414/547, 680; 410/50, 97, 99, 100
See application file for complete search history.

(56) References Cited

U.S. PATENT DOCUMENTS

| | | | | |
|---|---|---|---|---|
| 1,807,104 A * | 5/1931 | Schat | ......................... | 114/381 |
| 4,081,118 A * | 3/1978 | Mason | ......................... | 224/324 |
| 4,369,009 A * | 1/1983 | Fulford | ......................... | 410/35 |
| 4,396,138 A * | 8/1983 | Kirschner | ......................... | 224/318 |
| 4,900,203 A * | 2/1990 | Pope | ......................... | 410/36 |
| 5,516,017 A | 5/1996 | Arvidsson | | |
| 5,769,291 A * | 6/1998 | Chasan | ......................... | 224/324 |
| 5,775,557 A | 7/1998 | Arvidsson | | |
| 5,884,824 A | 3/1999 | Spring | | |
| 5,957,350 A | 9/1999 | Giles | | |
| 5,988,470 A | 11/1999 | Siciliano | | |
| 6,126,052 A | 10/2000 | Toivola | | |
| 6,164,507 A * | 12/2000 | Dean et al. | ......................... | 224/324 |
| 6,199,412 B1 * | 3/2001 | Kennedy | ......................... | 70/18 |
| 6,561,396 B2 | 5/2003 | Ketterhagen | | |
| 6,685,070 B2 | 2/2004 | Szigeti | | |
| 6,705,822 B2 | 3/2004 | Oldak | | |
| 7,131,561 B2 * | 11/2006 | Humes | ......................... | 224/319 |
| 2005/0077335 A1 * | 4/2005 | Bourne | ......................... | 224/319 |

* cited by examiner

*Primary Examiner*—Nathan J Newhouse
*Assistant Examiner*—Steven M Landolfi, Jr.
(74) *Attorney, Agent, or Firm*—Lawrence E. Laubscher, Jr.

(57) ABSTRACT

The invention is a watercraft carrier that can be easily loaded and secured. The carrier has a base and an arm with a belt that runs the length of both the base and the arm. A watercraft is placed within upon the base and against the arm. Then the belt is extended using a crank so that the belt come around the watercraft and the belt is secured using a fastener that is attached to the end of the belt. Then the belt is tightened to secure the watercraft by turning the crank the other direction or by use of a ratchet. In the preferred embodiment, the belt has a flexible stiffener added to make the belt stiffer, but still flexible enough to secure any shaped watercraft.

6 Claims, 7 Drawing Sheets

WATERCRAFT CARRIER

CROSS-REFERENCE TO RELATED APPLICATIONS

This application claims the benefit of Provisional Patent Application Ser. No. 60/655,338, filed Feb. 22, 2005 by the present inventor.

FEDERALLY SPONSORED RESEARCH not applicable

SEQUENCE LISTING OR PROGRAM:

not applicable

FIELD OF INVENTION

This invention relates to watercraft carriers. More specifically it relates to watercraft carriers for passenger vehicles. Even more specifically it relates to a carrier for kayaks and canoes for use with passenger vehicles.

BACKGROUND OF THE INVENTION

This invention is a watercraft carrier. The difficulty with using a roof mounted watercraft carrier on most vehicles is that the watercraft is large and unwieldy. This makes it difficult to mount the watercraft onto the carrier. This is especially true of taller vehicles and shorter people. In addition to the difficulty in mounting the watercraft, once the watercraft is mounted, getting straps that secure the watercraft in place is even more difficult. Again, short people and taller vehicles make this process even more difficult.

Other inventions have attempted to solve this problem. U.S. Pat. No. 6,561,396, by Ketterhagen, is an example of a system that lowers the carrier to a height that the user can easily load the watercraft. U.S. Pat. Nos. 5,775,557 and 5,516,017, both by Arvidsson, use a low profile carrier. The Arvidsson systems still require the user to reach the top of the carrier so that the user can attach a securing strap from one raised end of the carrier to another. The Ketterhagen patent avoids this problem by using a rigid clamp, instead of a strap.

The Arvidsson patents do not disclose a carrier that is more accessible to an average user. The Ketterhagen system is more accessible, but would require the clamp to be specially formed for each watercraft. On the other hand, the use of a strap by the Arvidsson patents makes the Arvidsson systems more adaptable to a variety of watercraft.

SUMMARY OF INVENTION

This invention is an article of manufacture that is a carrier for watercraft. The kayaks and canoes are the preferred watercraft, but any watercraft could be carried by this invention. This invention is envisioned as a rack that is mounted on top of a passenger vehicle. This invention could be used in any situation where it is mounted to another object.

The goal of this invention is be a watercraft carrier that is simple to make and operate and can be used with a large number of watercraft. This is accomplished by using an arm that will catch the watercraft when it is pushed onto the roof mounted carrier and then allowing the user to extend the strap by a simple means that does not require the user to reach past the lowest edge of the carrier. Then the strap can be secured around the watercraft and will fit the craft regardless of shape so that the watercraft is secure. Furthermore, the strap is easy to store when not in use, so that it will not be lost or unstowed and risk damaging the vehicle. Similarly, when the strap is in use, there is not excess material that could become unstowed and damage the vehicle. Finally, the carrier can be folded when not in use. This allows the carrier to be stored in a minimum profile position, reducing wind noise, decreasing drag, increasing vehicle fuel efficiency as compared to the raised position of the carrier and allowing the vehicle to drive under lower overhangs and garage ceilings.

The invention is a base with a bed and an arm. The base attaches to the roof rack of a passenger vehicle. The base is of a size so that two bases could fit across the roof of the vehicle if the two bases were placed end to end. The bed is on top of the base. The arm is attached to one end of the base. The arm is positioned so that it is near the middle of the roof of the vehicle. The arm rises up into the air relative to the base.

Attached to the end of the arm is a belt with a fastener. The belt is attached so that it can slide. The other end of the belt is permanently attached to the end of the base that is distal to the arm. The belt is threaded through, or threaded on the outside of the arm and the base so that it can slip back and forth. Also on the end of the base that is distal from the arm is the corresponding fastener to the fastener. The corresponding fastener is attached to the top of the base, next to the bed. In the preferred embodiment, the belt has a flexible stiffener within it. Also in the preferred embodiment, the belt is attached to a crank that can extend the belt and retract the belt. A ratchet can also be attached to the belt that can tighten the belt and secure the watercraft further. Alternatively, the ratchet can be attached to the corresponding fastener so that the ratchet can tighten the belt and secure the watercraft further.

To operate the invention, a kayak or other watercraft is placed on top of the base. The belt is extended around the kayak and the fastener is attached to the corresponding fastener. In the preferred embodiment, the invention has a means of tightening the belt. This could be a ratchet, a crank or a buckle.

In the preferred embodiment, when the invention is not in use, the belt can be retracted so that the fastener is proximal to the end of the arm. This can be done by a crank at the end of the base that is distal from the arm. The belt could be attached to the crank and when the crank is turned, the belt retracts. Alternatively, the belt could be elastic and once the fastener is unfastened, the belt automatically retracts.

The invention is mounted to the roof rack of the vehicle. Persons skilled in the art will recognize that there are a large number of ways to attach a carrier to a roof rack. The invention envisions the use of any system to attach to invention to the roof rack. The particular system used to attach the invention to the roof rack will not effect the functioning of the invention.

In the preferred embodiment, the invention is mounted onto the vehicles roof rack on a pivot. When the invention is not in use, the invention can be pivoted backwards to that it lies flat to the roof of the vehicle. Alternatively, just the arm could pivot.

The preferred embodiment envisions the use of two base and arm units to support each kayak. Other versions could use one or more than two.

BRIEF DESCRIPTION OF THE DRAWINGS

FIG. 8 is a perspective view of a combined base and arm for the belt shown in

FIG. 6.

DETAILED DESCRIPTION OF THE DRAWINGS

Figure 1:
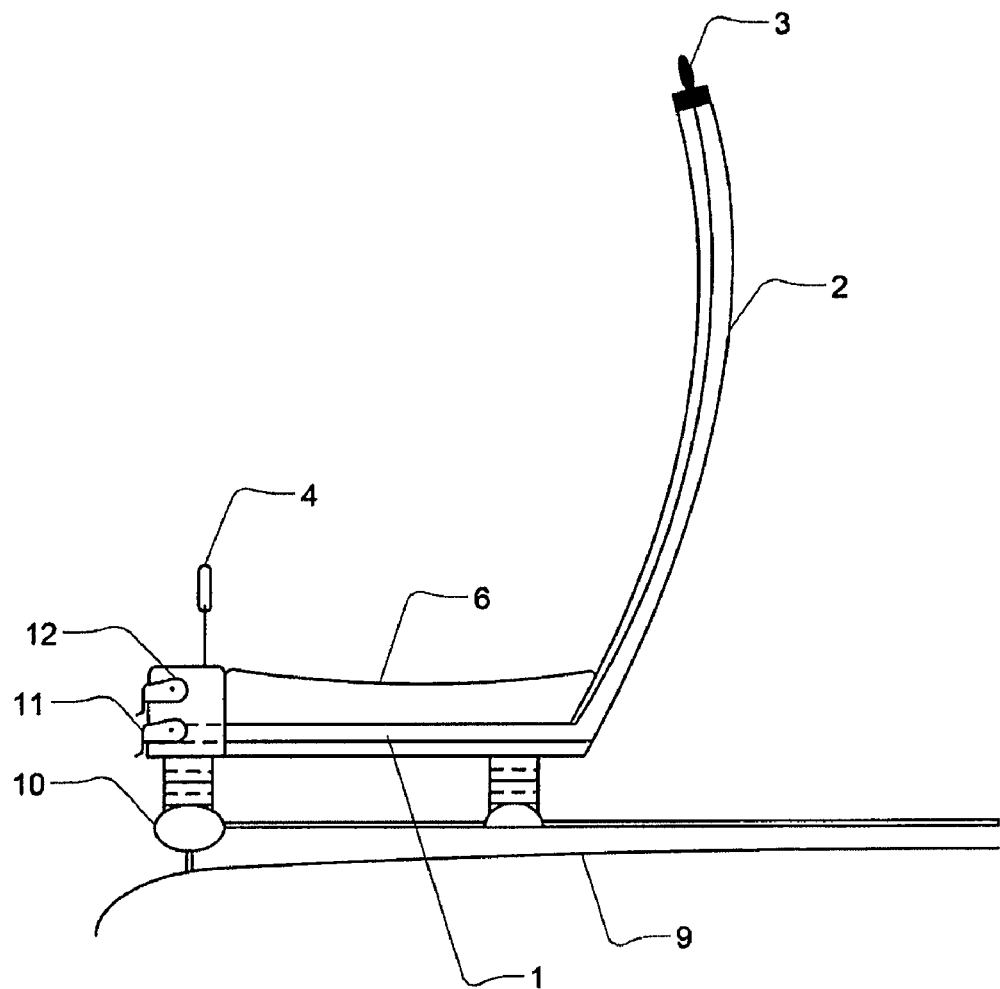
FIG. 1 is an illustration of the invention as viewed from the front of the vehicle.

FIG. 1 is an illustration of the invention as viewed from the front of the vehicle. The invention is placed upon a roof 9 of a vehicle. The invention is mounted unto the roof rack 10 of the vehicle. The base 1 attaches to the rack 10. Attached to the end of the base 1 that is proximal to the center of the vehicle is the arm 2. Attached to the end of the arm 2 that is distal to the base 1 is a fastener 3. Attached to the base 1 on the end that is proximal to the edge of the roof 9 of the vehicle and distal from the arm 2 is the corresponding fastener 4. Also attached to the base 1 on the end that is proximal to the edge of the roof 9 of the vehicle and distal from the arm 2 is a crank 11. FIG. 1. shows a preferred embodiment that includes a ratchet 12 attached to the distal end of base 1. Attached to the top of the base 1 is the bed 6.

Figure 2:
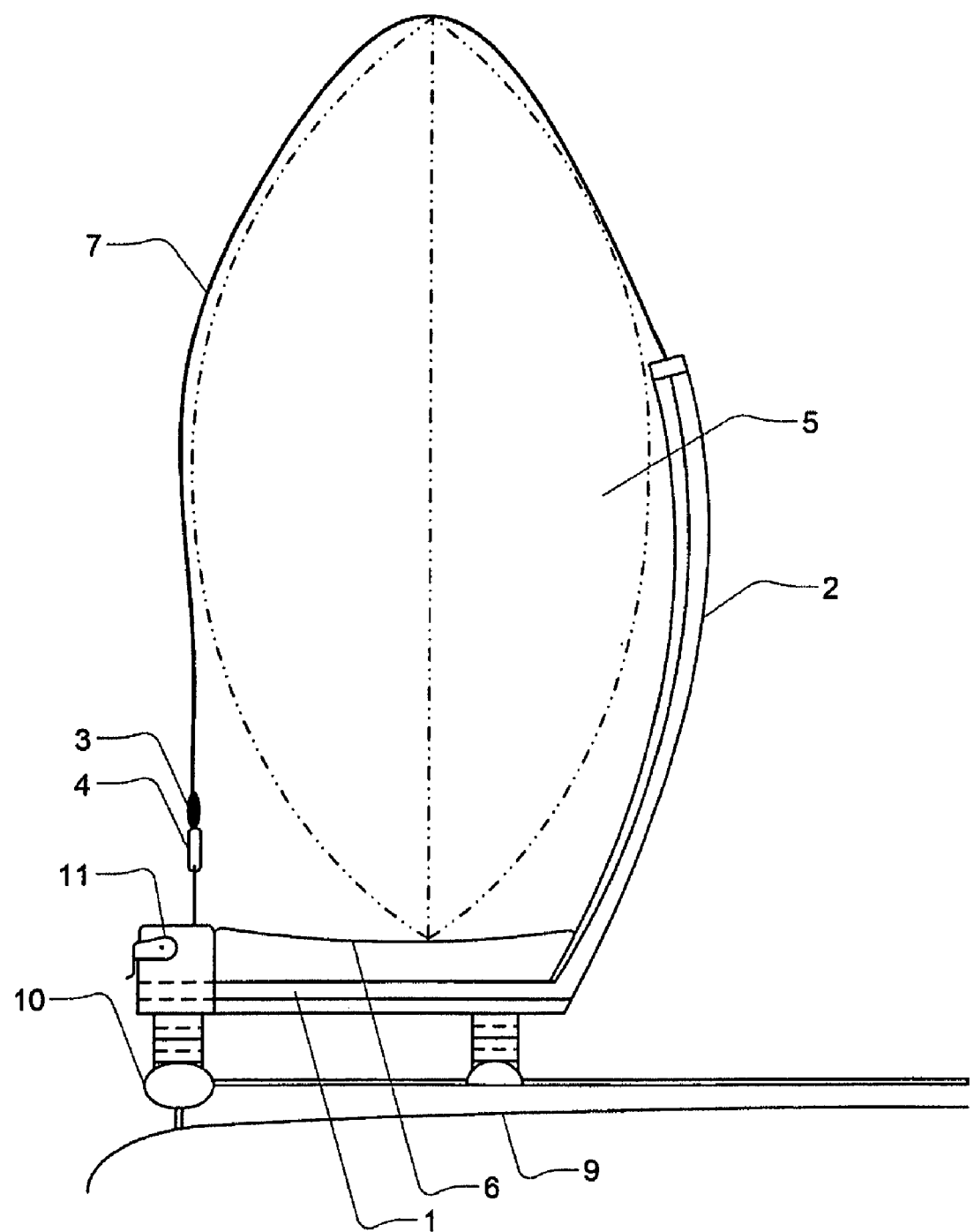
FIG. 2 is an illustration of the invention as viewed from the front of the vehicle with a kayak or watercraft in place.

FIG. 2 is an illustration of the invention as viewed from the front of the vehicle with a kayak or watercraft 5 in place. The watercraft 5 is resting on the bed 6 with the arm 2 on one side of the watercraft 5. The belt 7 is around the watercraft 5, securing the watercraft 5. At the end of the belt 7 is attached the fastener 3 which is in turn reversible attached to the corresponding fastener 4. As in FIG. 1, the invention is placed upon a roof 9 of a vehicle. The invention is mounted unto the roof rack 10 of the vehicle. The base 1 attaches to the rack 10. Attached to the end of the base 1 that is proximal to the center of the vehicle is the arm 2. Attached to the end of the arm 2 that is distal to the base 1 is a fastener 3. Attached to the base 1 on the end that is proximal to the edge of the roof 9 of the vehicle and distal from the arm 2 is the corresponding fastener 4. Also attached to the base 1 on the end that is proximal to the edge of the roof 9 of the vehicle and distal from the arm 2 is a crank 11. Attached to the top of the base 1 is the bed 6. FIG. 2. shows a preferred embodiment that does not include ratchet 12 attached to the distal end of base 1.

Figure 3:
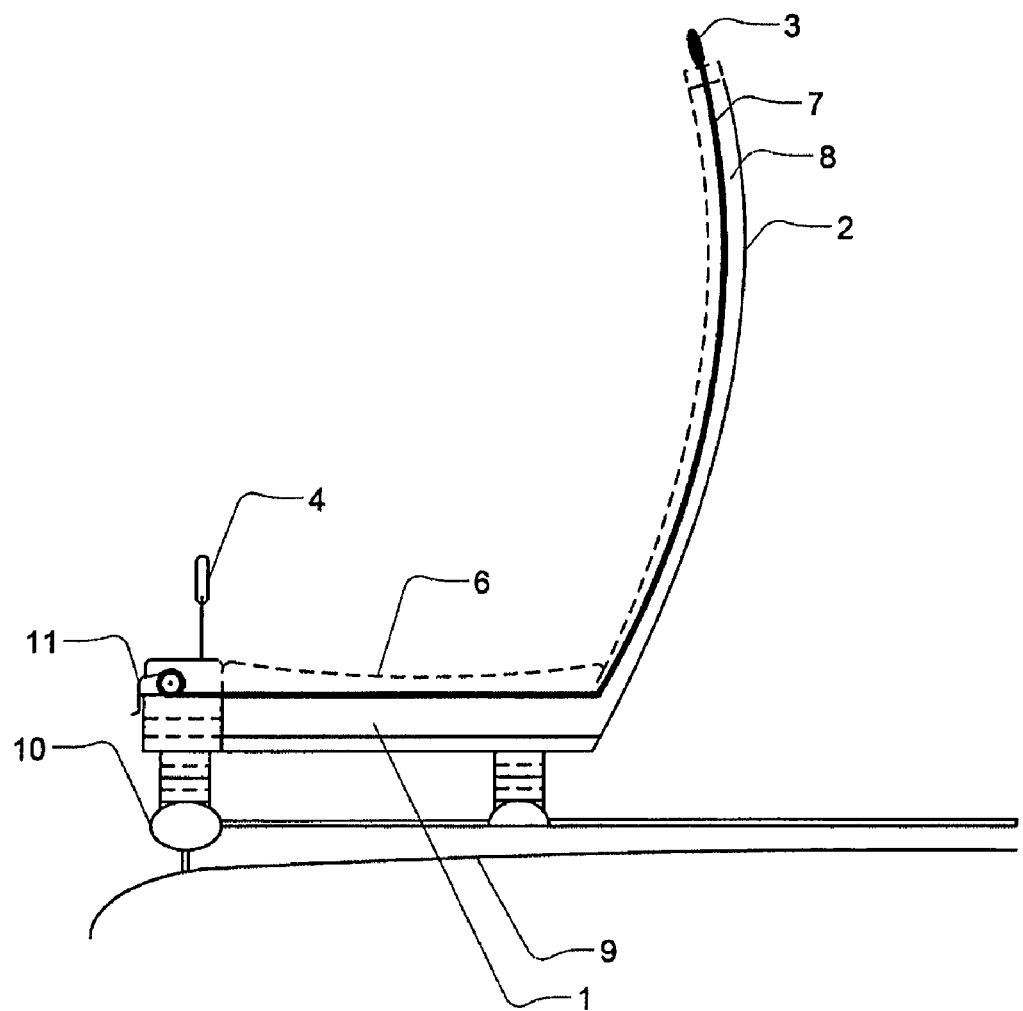
FIG. 3 is an illustration of the invention as viewed from the front of the vehicle with a cut-away view of the belt within the arm and base.

FIG. 3 is an illustration of the invention as viewed from the front of the vehicle with a cut-away view of the belt within the arm 2 and base 1. This cut-away view reveals the path of the belt 7 through the base 1 and arm 2, passing through space 8. The view also shows that belt 7 is attached to crank 11 and fastener 3. As in FIG. 1 and FIG. 2, the invention is placed upon a roof 9 of a vehicle. The invention is mounted unto the roof rack 10 of the vehicle. The base 1 attaches to the rack 10. Attached to the end of the base 1 that is proximal to the center of the vehicle is the arm 2. Attached to the end of the arm 2 that is distal to the base 1 is a fastener 3. Attached to the base 1 on the end that is proximal to the edge of the roof 9 of the vehicle and distal from the arm 2 is the corresponding fastener 4. Also attached to the base 1 on the end that is proximal to the edge of the roof 9 of the vehicle and distal from the arm 2 is a crank 11. Attached to the top of the base 1 is the bed 6. FIG. 3. shows a preferred embodiment that does not include ratchet 12 attached to the distal end of base 1.

Figure 4:
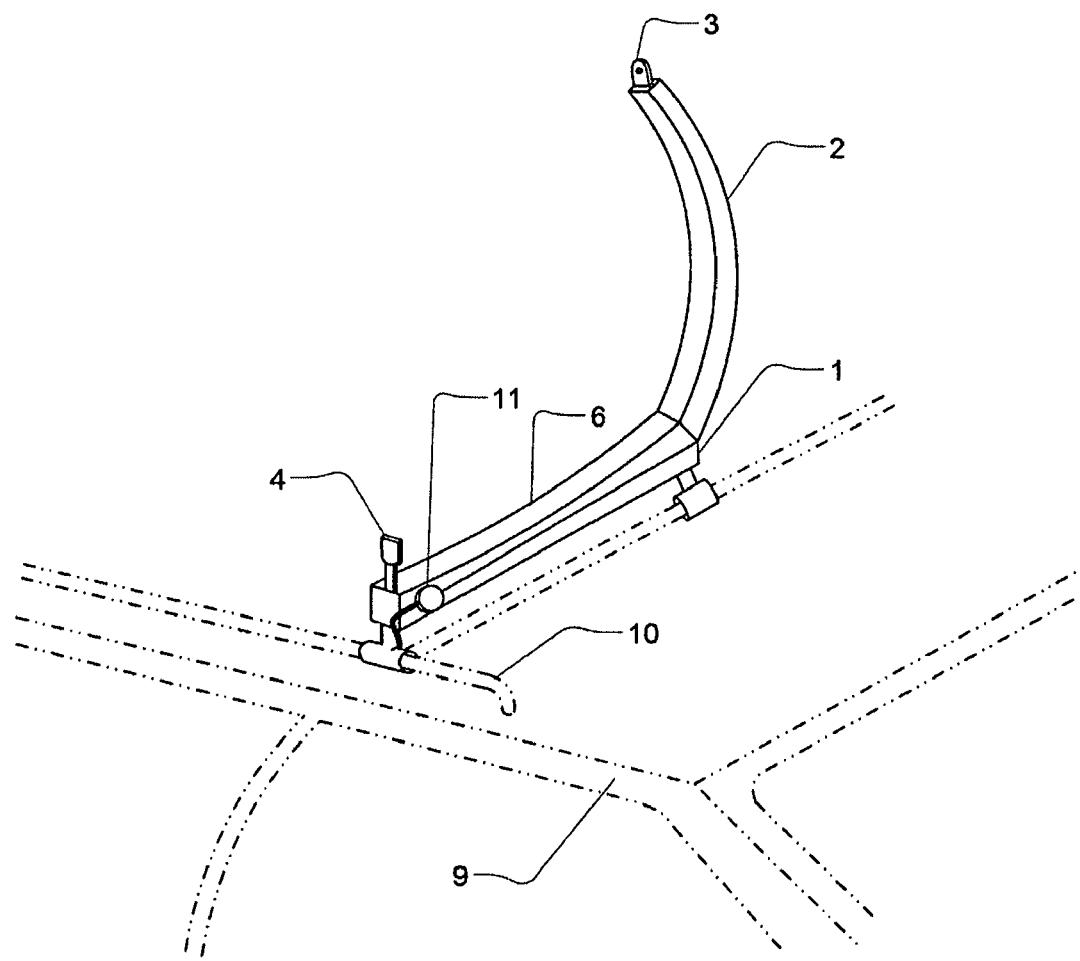
FIG. 4 is an illustration of the invention as viewed from the side of the vehicle.

FIG. 4 is an illustration of the invention as viewed from the side of the vehicle. As in FIGS. 1, 2, and 3, the invention is placed upon a roof 9 of a vehicle. The invention is mounted unto the roof rack 10 of the vehicle. The base 1 attaches to the rack 10. Attached to the end of the base 1 that is proximal to the center of the vehicle is the arm 2. Attached to the end of the arm 2 that is distal to the base 1 is a fastener 3. Attached to the base 1 on the end that is proximal to the edge of the roof 9 of the vehicle and distal from the arm 2 is the corresponding fastener 4. Also attached to the base 1 on the end that is proximal to the edge of the roof 9 of the vehicle and distal from the arm 2 is a crank 11. Attached to the top of the base 1 is the bed 6. FIG. 4. shows a preferred embodiment that does not include ratchet 12 attached to the distal end of base 1.

Figure 5:
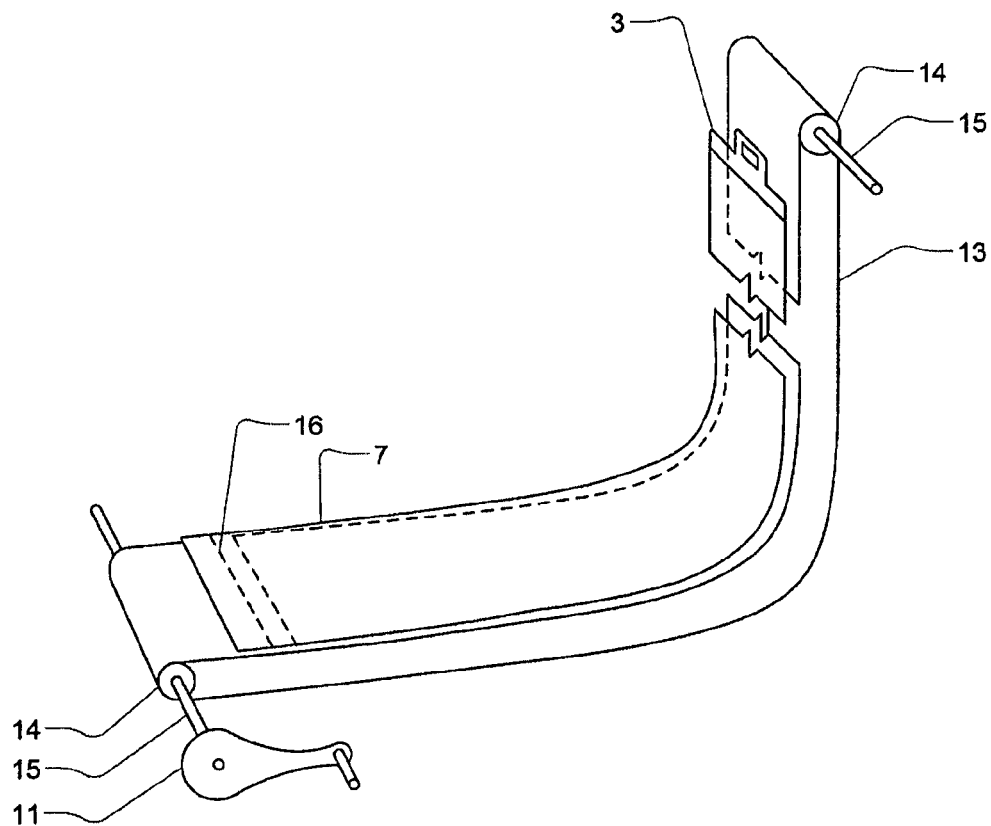
FIG. 5. is an illustration of a preferred embodiment of the belt and crank mechanism.

FIG. 5. is an illustration of a preferred embodiment of the belt and crank mechanism. The belt 7 is attached to a loop 13. Loop 13 is looped around a spool 14 on either end. The spool 14 is turned by an axel 15. The axel 15 is turned by crank 11. Belt 7 is attached to loop 13 at point 16. Point 16 is at the other end of belt 7 from fastener 3. FIG. 5 is shaped as if the belt and crank mechanism was within the base 1 and arm 2, as described above and below, but both base 1 and arm 2 have been excluded from FIG. 5 to give a full view of the belt and crank mechanism.

The invention has a base 1 with an arm 2 and a bed 6 attached. The arm 2 is attached so that it is vertical relative to the base 1 and points up. Bed 6 is on the top or vertical side of the base 1. In the preferred embodiment, both the bed 6 and the arm 2 are curved. The curve is concave so that the bed 6 and the arm 2 form part of a circular shape. The shape is not a perfect circle, but is flatter on the bottom and more curved on the sides. Other embodiments could use a straight or flat bed 6 and a straight or flat arm 2. Other embodiments could use a straight or flat bed 6 with a curved arm 2 or a curved bed 6 with a straight or flat arm 2. In the preferred embodiment, the combination of the base 1 and the arm 2 is 30"-36" in length and the arm 2 is 16"-18" in height. The combined length of the combination of the base 1 and the arm 2 can be either shorter or longer, as would be obvious to anyone skilled in the art. The height of arm 2 could be taller or shorter, as would be obvious to anyone who is skilled in the art. The arm 2 is joined to the base 1 so that the base 1 and the arm 2 form a single unit.

The base 1 is attached to the roof 9 of the vehicle by being attached to the roof rack 10 of the vehicle. The invention attaches by the bottom, or convex side, of the base 1. The arm 2 is positioned so that it is towards the center of the vehicle, rather than towards the edge or side of the vehicle. The base 1 is attached by any means, such as a clamp, loop, static mount or any other method, as would be obvious to persons skilled in the art. In the preferred embodiment, the base 1 can be tilted towards the roof 9 of the vehicle. A preferred embodiment envisions the base 1 attached to the roof rack 10 of the vehicle by a pivot so that it can be placed into storage while not in use. This pivot can be rotated backwards, relative to the front of the vehicle, so that when it is rotated down the base 1 and the attached arm 2 lays parallel to the roof 9 of the vehicle. The preferred embodiment envisions that the base 1 will not touch the roof 9 of the vehicle. Other embodiments could allow the base 1 to touch the roof 9 of the vehicle.

The base 1 is held in position by some method that holds it in place. A person skilled in the art will recognize that a number of means of attaching the base 1 to the roof rack 10 are possible. The invention is envisioned to be adapted to any commercially available roof rack attachment system or any custom roof rack attachment system. A preferred embodiment envisions a pivot that is a clamp or clasp that can be loosened or tightened. When the clamp is loosened, the base 1 can be rotated. The clamp can then be tightened so that the base 1 is securely attached to the roof rack 10 of the vehicle. Other versions could use a hinge or pivot that allows the base 1 to rotate. The preferred embodiment envisions the use of a locking pin with a push button release to secure the clamp that holds base 1 to the roof rack 10 of the vehicle. In other embodiments, the arm 2 is on a pivot that allows the arm 2 to be folded down for storage. The arm 2 can then be pivoted up for use. When the arm 2 is in the lower position it can reduce wind resistance generated by the watercraft carrier and it can reduce wind noise caused by the watercraft carrier. Also, when the arm 2 is in the down position, it reduces the overall height of the combination of the vehicle and the watercraft carrier.

When the base 1 or arm 2 is in the lower position it can reduce wind resistance generated by the watercraft carrier and it can reduce wind noise caused by the watercraft carrier. Also, when the base 1 or arm 2 is in the down position, it reduces the overall height of the combination of the vehicle and the watercraft carrier.

The bed 6 has a concave side that faces away from the roof 9 of the vehicle. Bed 6 can be made of many materials. In the preferred embodiment, bed 6 is made of foam, but any material would work. Possible soft materials, meant as examples, but not as limitations, are foam, cloth and rubber. Possible hard materials, meant as examples, but not as limitations, include wood, plastic and metal. The base 1 could be made with any material that is strong enough to support the watercraft. The preferred embodiment envisions the use of metal or plastic, but any material can be used.

The base 1 has an end that is proximal to the arm 2, and the center of the roof 9, and the base 1 has an end that is distal from the arm 2 and center of the roof 9. The proximal end of the base 1 is the end that is attached to the arm 2. The proximal end is also the end of the base 1 that is near the center of the roof 9 of the vehicle. The distal end of the base 1 is near the edge or side of the vehicle.

The arm 2 also has an end that is proximal to the base 1 and an end that is distal to the base 1. The proximal end of the arm 2 is the end that is attached to the base 1. In the some embodiments, the pivot for the arm 2 is at the junction of the proximal end of the base 1 and the proximal end of the arm 2. Other versions of the invention can lack the pivot and have the proximal end of the base 1 directly attached to the proximal end of arm 2. The arm 2 is made of a rigid material. The preferred embodiment envisions the use of metal or plastic. The arm 2 can also have foam or some soft material on the concave side of the arm 2. Possible soft materials, meant as examples, but not as limitations, are foam, cloth and rubber. Other versions of the arm 2 will have a hard material on the concave side of the arm 2.

The distal end of the arm 2 has a belt 7 that extends from the distal end of the arm 2. This belt 7 also has a proximal and distal end. The distal end of the belt 7 has a fastener 3 attached to it. In the preferred embodiment, both the base 1 and the arm 2 are hollow, forming space 8. The proximal end of belt 7 attached to the distal end of the base 1 and threaded through space 8 in the base 1 and then the arm 2 to extend out the distal end of the arm 2. In one preferred embodiment, the proximal end of belt 7 is attached to crank 11 at the distal end of base 1 that is proximal to the edge of roof 9. The crank 11 can be used to extend or retract the belt 7. In another preferred embodiment, the space 8 is partly made by a hollow space 8 between base 1 and bed 6. In another preferred embodiments, the arm 2 is hollow and the belt 7 is attached at the proximal end of the arm 2 and threaded through the hollow space 8 to extend out the distal end of the arm 2.

In alternative versions of the invention, the belt 7 can be on the outside of either arm 2, bed 6 or base 1, or any combination of the three elements. In these cases, the path of the belt 7 will be the same, but it will be on the outside of the arm 2, base 1, bed 6 or some combination of the three.

The belt 7 can be made of any material. The preferred embodiment envisions the use of tubular nylon webbing with a flexible stiffener added, but any nylon webbing, rope, cord, cloth, chain or tubing could be used. Alternatively a curved rigid material could be used, such as metal or plastic. The fastener 3 at the distal end of the belt 7 is envisioned to be a buckle, but any fastener 3 could be used. As an example, and not meant as a limitation, other fasteners could be hooks, statistical fasteners, snaps, carabineers, clips and ties.

The belt 7 can be extended from the arm 2 by any means that could extend the belt 7. The preferred embodiment envisions the use a crank 11 to release the belt 7 or retract the belt 7. The operator would turn the crank 11 and extend the belt 7 so that it is extended out the distal end of the arm 2. The operator would then turn the crank 11 in the other direction to retract the belt 7 into the arm 2 when the belt 7 is being stored when not in use.

A preferred embodiment of the belt 7 and crank 11 combination is a belt and crank mechanism, as shown in FIG. 5. This mechanism uses a loop 13 to transmit the turning of the crank 11 to the extension of the belt 7. The belt 7 is attached to the loop 13 at point 16. The loop 13 is then looped around spools 14. One spool 14 is at the end of the base 1 that is distal from the arm 2 and proximal to the edge of the roof 9 of the vehicle. The other spool 14 is at the end of the arm 2 that is distal from the base 1. Each spool 14 is attached to an axle 15. The axle 15 allows the spool 14 to turn and thus move the loop 13, which in turn moves the belt 7. The axle 15 for the spool 14 that is at the end of the base 1 that is distal from the arm 2 and proximal to the edge of the roof 9 of the vehicle is attached to the crank 11. When crank 11 is turned, axle 15 is turned, which turns spool 14, which turns loop 13, which turns belt 7. Other versions of the invention could have only spool 14 and no axle 15. In this case crank 11 would be attached directly to spool 14. In this preferred embodiment, belt 7 is attached to loop 13 at point 16 by stitching. Other versions could use heat fusion, glue or adhesives. Still other versions could form loop 11 and belt 7 from a single piece of material. Persons skilled in the art could see other alternative methods of attachment.

Another embodiment envisions the use of a ramrod that pushes the belt 7 through the arm 2 so that the belt 7 extends out the distal end of the arm 2. The ramrod is stored in a hollow tube within the roof rack 10 or attached to the outside of the roof rack 10. In the embodiment of the invention that uses the ramrod, the ramrod would enter the base 1 at the point where the crank 11 would otherwise be. Alternatively, the belt 7 can be retracted by pulling the ramrod back into the ready position and pulling the belt 7 into the arm 2. The ramrod is placed on the inside of the hollow part of the base 1 and can be pushed into the base 1 and pulled out of the base 1. Alternatively, the ramrod can be attached to a lever that can slide back and forth, moving the ramrod and extending or retracting the belt 7.

Another embodiment would involve a belt 7 made of elastic cord or a belt 7 attached to the proximal end of the arm 2 by an elastic cord. The operator would pull the belt 7 out for use and fasten the fastener. When the fastener 3 is released, the elastic would pull the belt 7 into the arm 2 for storage.

Another embodiment would use a circular belt 7 within the base 1 and arm 2. The circular belt 7 is attached to the belt 7 that has the fastener attached to the distal end of the belt 7. The circular belt 7 is also attached to a crank 11. When the crank 11 is turned, the circular belt 7 turns, extending the belt 7 with the fastener. When the crank 11 is turned the other direction, the circular belt 7 retracts the belt 7 with the fastener.

The distal end of the base 1 has the corresponding fastener 4 for the fastener 3 that is attached to the distal end of the belt 7. The fastener 3 can be reversibly attached to the corresponding fastener 4. In the preferred embodiment, the corresponding fastener 4 is attached to the distal end of the base 1 so that it is in a fixed position pointing up. In other embodiments, the corresponding fastener 4 could be attached so that it points in another direction. Also in other embodiments, the corresponding fastener 4 could be attached to a length of material. That length of material could be attached to the distal end of the base 1. The length of material could be either flexible or rigid.

One preferred embodiment includes a ratchet 12 that is attached to the end of the base 1 that is distal from the arm 2 and proximal to the edge of the roof 9 of the vehicle. Ratchet 12 is also attached to corresponding fastener 4. Once fastener 3 is attached to corresponding fastener 4, ratchet 12 can be used to tighten belt 7. Alternatively, ratchet 12 could be attached to belt 7.

The invention is operated by pivoting the combination of base 1 and arm 2 upwards and towards the center of the vehicle. A watercraft 5 is placed onto the bed 6. Once the watercraft is resting on the bed 6, on top of the vehicle, then the belt 7 is extended to come around the watercraft by turning crank 11. The belt 7 is then fastened to the corresponding fastener 4 on the base 1 by reversibly attaching fastener 3 to corresponding fastener 4. The belt 7 is tightened by a ratchet, turning the crank 11 the other direction, or other tightener. Thus the watercraft is held into position on the roof 9 of the vehicle. When the watercraft is removed from the vehicle, the arm 2 and base 1 are pivoted down to its storage position.

The fastener 3 can be secured to corresponding fastener 4 by a lock to limit access to the watercraft. The lock could be a combination lock, a key lock or an electronic lock.

Figure 6:
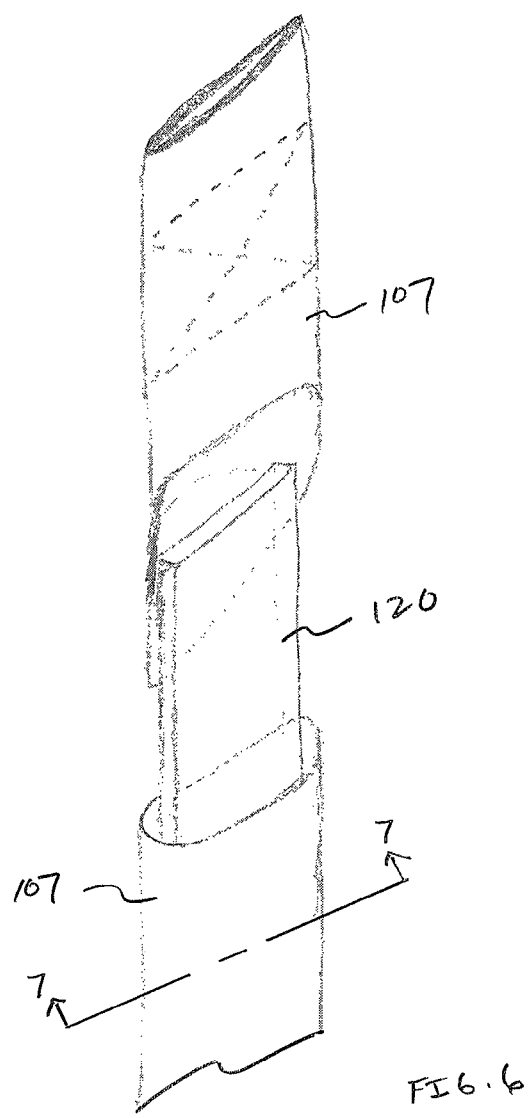
FIG. 6 is a partial sectional view of a further embodiment of the belt according to the invention.
Figure 7:
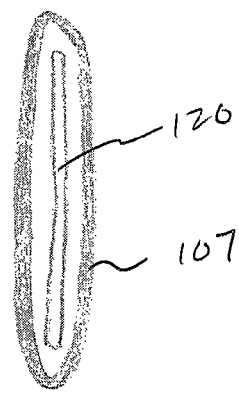
FIG. 7 is a sectional view taken along line 7-7 of FIG. 6.
Figure 8:
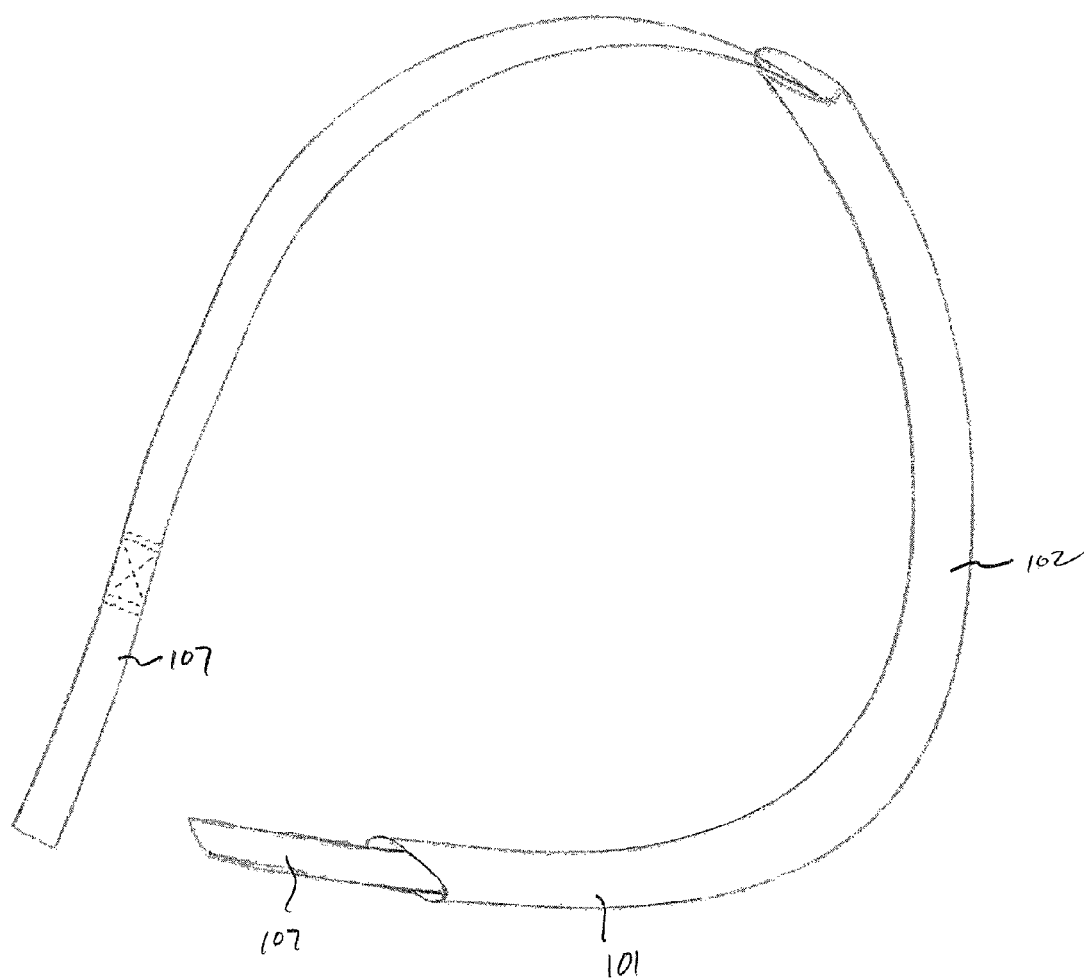

As set forth above, the belt may include a flexible stiffener. Referring to FIGS. 6 and 7, there is shown a belt 107 formed of nylon webbing material or the like which contains an internal flexible stiffener 120. As shown in FIG. 8, the belt and stiffener combination is passed through the base 101 and the curved arm 102. Because of the stiffener, no external displacement mechanism such as the crank 11 is required. Rather, the user merely pushes the belt and stiffener combination into the base and the stiffener guides the belt through the arm. Because of the curvature of the arm, the forward end of the belt is directed back to the user where it exits the arm. Thus, when a watercraft is arranged on a bed (not shown) adjacent to the base 1, the belt passes over the watercraft and back to the user who can easily secure the forward end of the strap to a fastener as described above to tighten and secure the belt about the watercraft.

Although this invention has been illustrated by reference to specific embodiments, it will be apparent to those skilled in the art that various changes and modification may be made which clearly fall within the scope of the invention. The invention is intended to be protected broadly within the spirit and scope of the appended claims.

What is claimed is:

1. A watercraft carrier for mounting on the roof of a vehicle, comprising
   (a) a hollow elongated base arranged generally parallel to and extending across the vehicle roof, said base having first and second ends and containing a channel;
   (b) a hollow arm having first and second ends and containing a channel, said arm first end being connected with said base second end with said base and arm channels being connected to define a continuous channel, said arm being arranged generally normal to said base and having a concave configuration wherein said arm extends upwardly and away from said base second end toward a central region of said arm and further upwardly and toward said base first end beyond a central region of said arm;
   (c) a flexible belt arranged within said base and arm channels; and
   (d) a flexible stiffener element arranged within said belt for guiding said belt into said base channel at said base first end and through said base and arm channels, said belt being directed back toward said base first end by said concave arm; and
   (e) first fastener means connected with an end of said belt adjacent to said stiffener element and second fastener means attached to said base, whereby when a watercraft is arranged on said base, a user can displace said belt and said stiffener element through said base and arm channels, said arm directing said belt from said arm second end around the watercraft and back to said base first end so that the user can connect the first fastener means to the second fastener means to secure the watercraft enveloped by said belt to said base and to said arm.

2. A watercraft carrier as defined in claim 1, and further comprising a bed connected with said base for supporting the watercraft.

3. A watercraft carrier as defined in claim 1, wherein said first and second fastener means comprise a buckle.

4. A watercraft carrier as defined in claim 1, and further comprising a crank connected with said belt for displacing said belt through said channels.

5. A watercraft carrier as defined in claim 1 wherein said belt is formed of webbing material.

6. A watercraft carrier as defined in claim 1, wherein said base and said arm are formed as a unitary structure.

* * * * *